United States Patent
Weng et al.

(10) Patent No.: US 7,722,250 B2
(45) Date of Patent: May 25, 2010

(54) PROBE COVER FOR EAR THERMOMETER

(75) Inventors: Vincent Weng, HsinChu (TW); Kevin Lin, HsinChu (TW); James Huang, HsinChu (TW)

(73) Assignee: Radiant Innovation Inc., Hsinchu (TW)

( * ) Notice: Subject to any disclaimer, the term of this patent is extended or adjusted under 35 U.S.C. 154(b) by 0 days.

(21) Appl. No.: 12/318,357

(22) Filed: Dec. 29, 2008

(65) Prior Publication Data

US 2009/0116540 A1    May 7, 2009

Related U.S. Application Data

(63) Continuation-in-part of application No. 11/545,506, filed on Oct. 11, 2006, now abandoned.

(51) Int. Cl.
*G01K 1/08* (2006.01)
(52) U.S. Cl. .................................... 374/209; 374/158
(58) Field of Classification Search ............ 374/158, 374/209
See application file for complete search history.

(56) References Cited

U.S. PATENT DOCUMENTS

| 3,878,836 | A | * | 4/1975 | Twentier | .................. 600/200 |
| 4,602,642 | A | | 7/1986 | O'Hara et al. | |
| 4,662,360 | A | | 5/1987 | O'Hara et al. | |
| 4,790,324 | A | | 12/1988 | O'Hara et al. | |
| 5,088,834 | A | | 2/1992 | Howe et al. | |
| 5,179,936 | A | | 1/1993 | O'Hara et al. | |
| 5,293,862 | A | | 3/1994 | O'Hara et al. | |
| 5,516,010 | A | | 5/1996 | O'Hara et al. | |
| 5,707,343 | A | | 1/1998 | O'Hara et al. | |
| 5,795,067 | A | * | 8/1998 | Fraden et al. | ............ 374/158 |
| 5,833,367 | A | * | 11/1998 | Cheslock et al. | ............ 374/158 |
| 5,980,451 | A | | 11/1999 | O'Hara et al. | |
| 6,123,454 | A | | 9/2000 | Canfield et al. | |
| 6,152,596 | A | | 11/2000 | Fraden | |
| 6,156,148 | A | | 12/2000 | Beerwerth et al. | |
| 6,647,284 | B1 | | 11/2003 | Lee | |
| 7,520,671 | B2 | * | 4/2009 | Lantz et al. | ............ 374/158 |
| 7,572,056 | B2 | * | 8/2009 | Lane et al. | ............ 374/158 |
| 2007/0091980 | A1 | * | 4/2007 | Tanaka | ............ 374/121 |

\* cited by examiner

*Primary Examiner*—Gail Verbitsky
*Assistant Examiner*—Mirellys Jagan
(74) *Attorney, Agent, or Firm*—Rosenberg, Klein & Lee

(57) ABSTRACT

The present invention discloses a probe cover for an ear thermometer, which comprises: a film cover and a base. The film cover has a cover window able to contact the probe window at the front end of the ear thermometer, a hollow cone able to contact the sidewall of the probe and a strengthened element able to contact the cover window and the hollow cone. The thickness of the cover window is same as the thickness of the strengthened element and greater than the thickness of the hollow cone. Thereby, the present invention can prevent the variation of infrared transmittance caused by the misarrangement and non-uniform thickness of the probe cover film disposed at the front of the probe window.

5 Claims, 2 Drawing Sheets

PROBE COVER FOR EAR THERMOMETER

RELATED APPLICATIONS

The present invention is a continuation-in-part application of the application that is entitled "PROBE COVER FOR EAR THERMOMETER" (Application NO.: U.S. application Ser. No. 11/545,506), which is filed Oct. 11, 2006, now abandoned presently with the U.S. Patent & Trademark Office, and which is used herein for reference in its entirety.

BACKGROUND OF THE INVENTION

1. Field of the Invention

The present invention relates to a probe cover for an ear thermometer, particularly to a design, which can prevent the variation of the infrared transmittance of the probe cover film and avoid the error of body temperature measurement.

2. Description of the Related Art

Nowadays, it is very popular to measure the body temperature with an ear thermometer. However, the ear thermometer has to reach into the ear canal. For sake of hygiene, the probe of an ear thermometer is sleeved with a probe cover lest dirt and germs pollute the probe.

FIG. 1A shows a probe cover of a tympanic thermometer and tympanic thermometer assembly disclosed in U.S. Pat. No. 6,647,284 B1. The conventional probe cover comprises a base 16 and a frustum-shaped sheath 12. The frustum-shaped sheath 12 has a cover window 121 able to contact the probe window 14 of an ear thermometer and a cover sidewall 122 able to contact the probe casing. The cover window 121 is thicker than the cover sidewall 122; moreover, the thickness of the cover sidewall 122 is gradually getting thinner from the base 16 to the cover window 121. Thus, the thickness of the probe cover is b<c<d<a.

Refer to FIG. 1B. However, when the probe is sleeved with the frustum-shaped sheath 12, the cover window 121 is usually hard to exactly coincide with the probe window 14, i.e. the film covering the probe window 14 is not completely the film of the cover window 121 but partially the film of the cover sidewall 122. In such a case, the infrared light will pass a film with a non-uniform thickness so the result of temperature measurement will be inaccurate. Furthermore, the other consideration causes a heavy burden which is that the cover window 121 needs to be situated exactly in the center of the frustum-shaped sheath 12 during manufacturing. Otherwise, the conventional probe cover will be unsuitable to coincide with the the probe.

Accordingly, the present invention proposes a probe cover for an ear thermometer to overcome the abovementioned problem.

SUMMARY OF THE INVENTION

The primary objective of the present invention is to provide a probe cover for an ear thermometer, which can be fast and precisely sleeved over the probe of an ear thermometer and can avoid the non-uniform thickness of the film covering the probe window whereby the body temperature can be accurately measured.

The another objective of the present invention is to provide a probe cover for an ear thermometer which can be easily manufactured without orienting the center of the probe cover and precisely centering the cover window around the cover sidewall so that the manufacturing process can be simplified.

To achieve the abovementioned objective, the present invention proposes a probe cover for an ear thermometer, which comprises: a film cover and a base with a central opening, wherein the film cover has a cover window able to contact the probe window of the ear thermometer, a hollow cone able to surround the sidewall of the probe. Besides, a strengthened element connecting the cover window with the hollow cone; the thickness of the cover window equals the thickness of the strengthened element so that the probe window can be totally covered by a fixed film of the cover window and the strengthened element. Thereby, the personnel can measure body temperature more accurately, and the manufactory can also omit the intricate procedures to save its production cost.

To enable the objective, technical contents, characteristics, and accomplishments of the present invention to be easily understood, the embodiments of the present invention are to be described in detail in cooperation with the attached drawings below.

DETAILED DESCRIPTION OF THE INVENTION

Figure 1B:
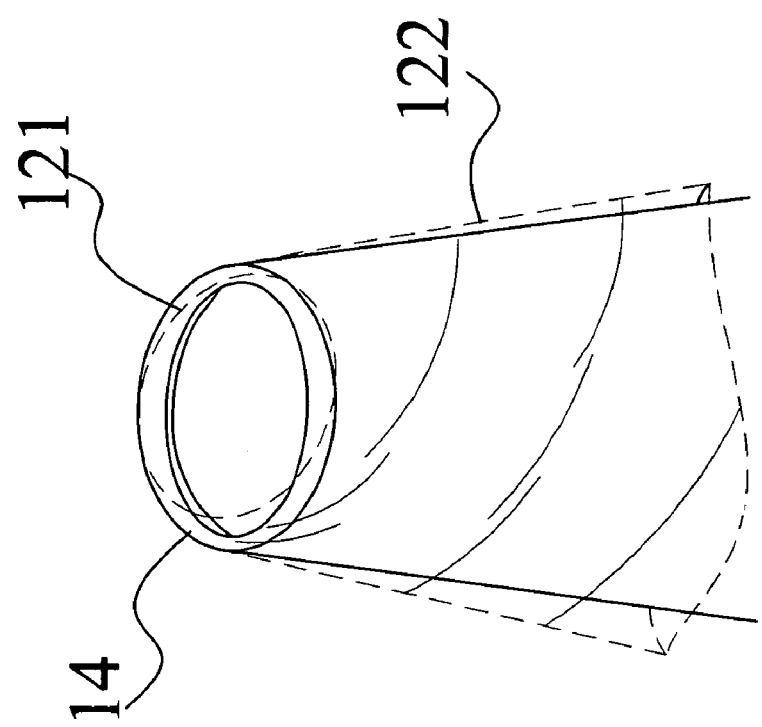
FIG. 1B is a perspective view schematically showing the misarrangement of a conventional probe cover.
Figure 1A:
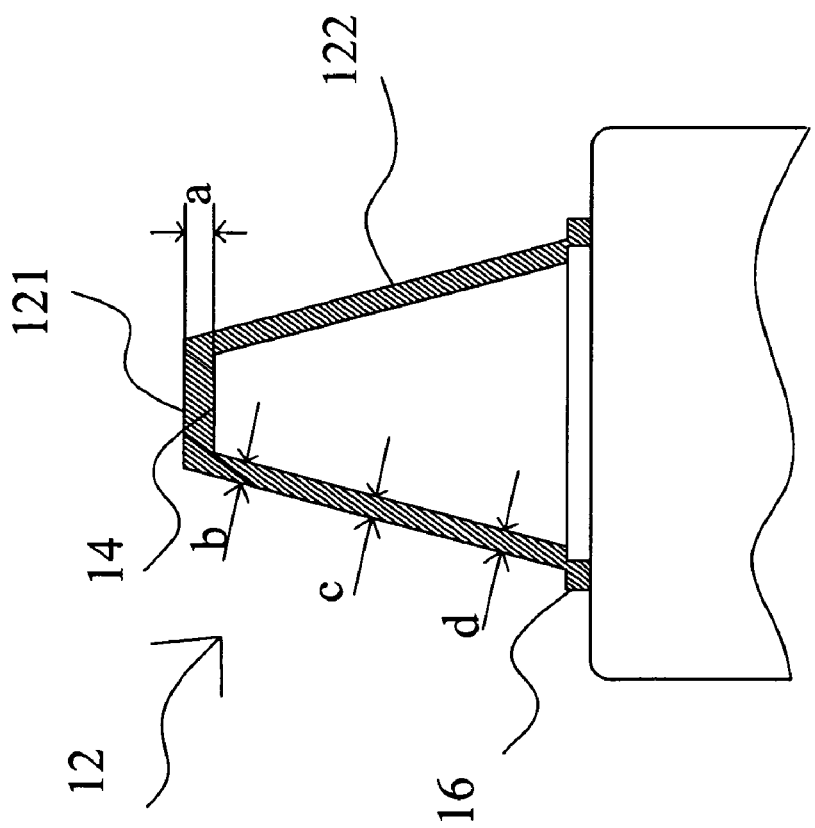
FIG. 1A is a sectional view schematically showing that a conventional probe cover is installed to the probe of an ear thermometer.
Figure 3:
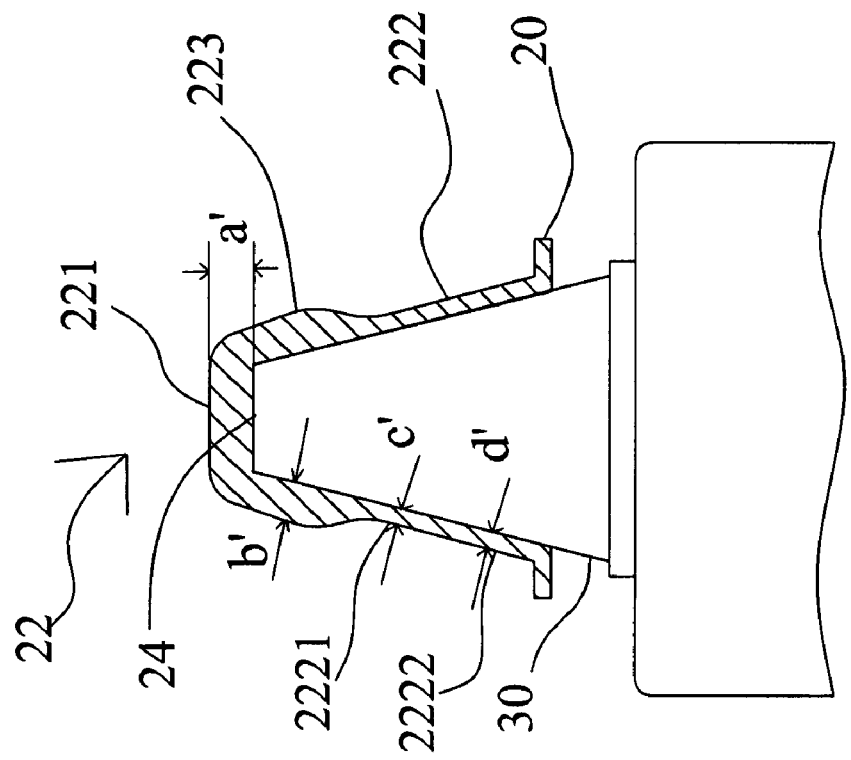
FIG. 3 is a sectional view schematically showing the probe cover for an ear thermometer according to the present invention.
Figure 2:
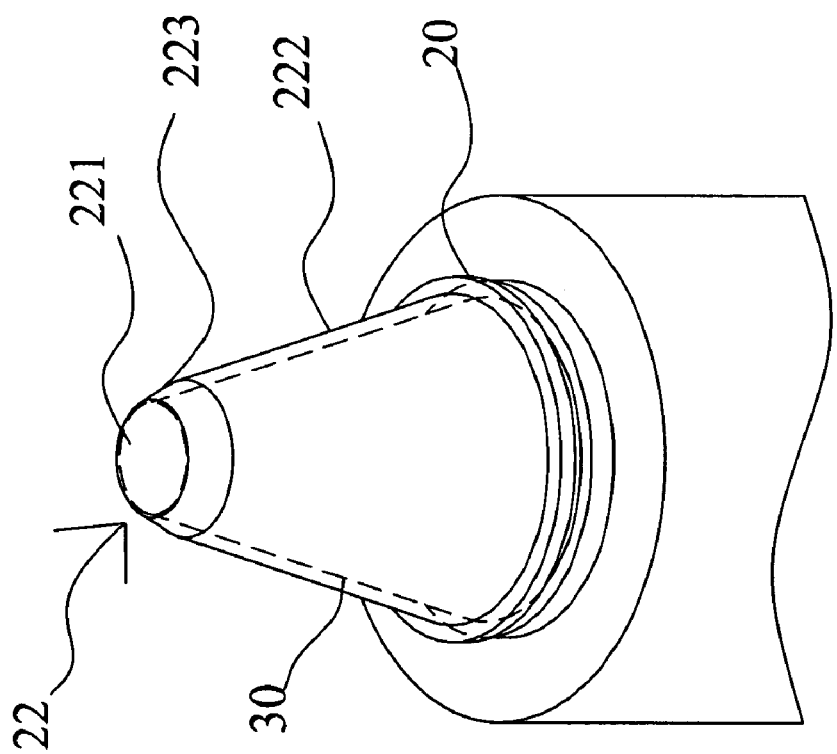
FIG. 2 is a perspective view schematically showing the probe cover for an ear thermometer according to the present invention.

Refer to FIG. 2 and FIG. 3, respectively a perspective view and a sectional view schematically showing the probe cover for an ear thermometer according to the present invention. As shown in the drawings, the probe cover for an ear thermometer of the present invention comprises: a base 20 having a central opening and a film cover 22 having a cover window 221, a strengthened element 223 wherein the thickness of the strengthened element 223 equals the thickness of the cover window, and a hollow cone 222 wherein includes the first hollow cone 2221 and the second hollow cone 2222. The cover window 221 is located within the center of the film cover 22. The strengthened element 223, which is a buffer region, connects the cover window 221 and the hollow cone 222; the hollow cone 222 extends from the strengthened element 223 to the central opening of the base 20 and joins the base 20.

Assume that the thicknesses of the cover window 221, the strengthened element 223, the first hollow cone 2221 and the second hollow cone 2222 are a', b', c' and d' respectively. Comparing with the thickness distribution of the prior art, the present invention is characterized in that the thickness of the film cover is a'=b'>c'=d'. The advantage of the characteristic can avoid the non-uniform thickness of the film covering the probe window. This is because the ear thermometer still works precisely when the film covering the probe window is not only the cover window 221 but also the strengthened element 223, i.e. the cover film covering the probe window all belongs to the a fixed thickness. Thereby, when the personnel have installed the probe cover of the present invention over the probe, they can be free from the conventional trouble that they have to check whether the cover window has exactly coincided with the probe window. Moreover, the manufactory does not have to orient the circle of the cover window exactly in the center of the film cover. Therefore, the probe cover of the present invention can reduce the manufacturing difficulty and promote the accuracy of body temperature measurement.

The base 20 may be made of a more rigid plastic material. The film cover 22, which includes the cover window 221, the hollow cone 222 and the strengthened element 223, may be made of an infrared-permeable plastic material so that the cover window, the strengthened element and the hollow cone are fabricated into a one-piece element. Thereby, the film cover 22 can cover with the probe of the ear thermometer uniformly and smoothly.

When the film cover 22 sleeves the probe, the base 20 is to be installed to the probe structure 30 of the ear thermometer fixedly. At the same time the cover window 221 is pulled to connect the window of the probe structure 30 uniformly; the strengthened element 223 and the hollow cone 222 are pulled to fit the sidewall of the probe structure perfectly.

Those described above are only the preferred embodiments to clarify the technical contents and characteristics of the present invention to enable the persons skilled in the art to understand, make and use the present invention. However, it is not intended to limit the scope of the present invention. Any modification and variation according to the spirit of the present invention is to be also included within the scope of the claims of the present invention.

What is claimed is:

1. A probe cover for an ear thermometer, used to sleeve the probe of an ear thermometer having a probe window, and comprising:

a base having a central opening; and a film cover including:

a cover window;

a strengthened element surrounding said cover window, wherein a thickness of said cover window (a') equals a thickness of said strengthened element (b'); and a hollow cone extending from said strengthened element to said central opening and joining said base and said hollow cone comprises a first hollow cone portion and a second hollow cone portion, wherein a thickness of said first hollow cone portion (c') is equal to a thickness of said second hollow cone portion (d'), and is smaller than said thickness of said cover window (a') and said thickness of said strengthened element (b').

2. The probe cover for an ear thermometer according to claim 1, wherein said film cover is made of infrared-permeable plastic material.

3. The probe cover for an ear thermometer according to claim 1, wherein said cover window, said strengthened element and said hollow cone are fabricated into a one-piece element.

4. The probe cover for an ear thermometer according to claim 1, wherein said base is installed on the probe of the ear thermometer and fixedly encircles the probe of the ear thermometer.

5. The probe cover for an ear thermometer according to claim 1, wherein said base is made of rigid plastic material.

* * * * *